United States Patent
Weber et al.

(10) Patent No.: US 9,575,352 B2
(45) Date of Patent: Feb. 21, 2017

(54) ADDRESSABLE SWITCHABLE TRANSPARENT DISPLAY

(71) Applicant: 3M INNOVATIVE PROPERTIES COMPANY, St. Paul, MN (US)

(72) Inventors: Brian T. Weber, Saint Paul, MN (US); Qingbing Wang, Woodbury, MN (US); Patrick M. Campbell, Saint Paul, MN (US); Glenn E. Casner, Woodbury, MN (US); Guanglei Du, Saint Paul, MN (US); John A. Wheatley, Lake Elmo, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 740 days.

(21) Appl. No.: 13/948,371

(22) Filed: Jul. 23, 2013

(65) Prior Publication Data

US 2015/0029211 A1    Jan. 29, 2015

(51) Int. Cl.
*G02F 1/133* (2006.01)
*G02F 1/1334* (2006.01)
(Continued)

(52) U.S. Cl.
CPC ............. *G02F 1/1334* (2013.01); *G09G 3/00* (2013.01); *G02F 1/13718* (2013.01); *G02F 2001/13775* (2013.01)

(58) Field of Classification Search
CPC .............. G02F 2001/13775; G02F 1/1323; G02F 1/1333; G02F 1/133365; G02F 1/1334; G02F 1/13342; G02F 1/13718; G02F 1/133606; G02F 1/133; G02F 2203/62
(Continued)

(56) References Cited

U.S. PATENT DOCUMENTS 3,576,364 A    4/1971 Zanoni
3,718,712 A    2/1973 Tushaus
(Continued)

FOREIGN PATENT DOCUMENTS

CN    201138554    10/2008
DE    4215868    11/1993
(Continued)

OTHER PUBLICATIONS

Fuh, "Studies of Polymer-Stabilized Cholesteric Texture Films", Display Technologies III, Proceedings. Of SPIE, Jun. 30, 2000, vol. 4079, pp. 184-190.
(Continued)

*Primary Examiner* — Thoi Duong
(74) *Attorney, Agent, or Firm* — Lance Vietzke; Clifton F. Richardson

(57) ABSTRACT

A display system includes a switchable display screen comprising a first transparent substrate, a first transparent conductive layer disposed upon the first transparent substrate, a second transparent substrate, and a second transparent conductive layer disposed upon the second transparent substrate. The display screen further includes a polymer-stabilized cholesteric texture layer and spacer elements disposed between and in contact with the first transparent conductive layer and the second conductive layer. The display screen comprises a plurality of addressable regions, each region capable of being switched from a transparent state to a diffuse state.

17 Claims, 12 Drawing Sheets

(51) Int. Cl.
*G09G 3/00* (2006.01)
*G02F 1/137* (2006.01)

(58) Field of Classification Search
USPC ............. 349/86, 88, 90, 157, 168, 175, 183, 185,349/89, 65
See application file for complete search history.

(56) References Cited

U.S. PATENT DOCUMENTS

| | | | |
|---|---|---|---|
| 5,516,455 | A | 5/1996 | Jacobine |
| 5,644,330 | A * | 7/1997 | Catchpole ............ G09G 3/3629 345/210 |
| 6,671,008 | B1 | 12/2003 | Li |
| 6,996,532 | B2 | 2/2006 | Thomas |
| 7,005,394 | B1 | 2/2006 | Ylitalo |
| 7,009,665 | B2 | 3/2006 | Li |
| 7,259,730 | B2 | 8/2007 | O'Keeffe |
| 7,336,271 | B2 | 2/2008 | Ozeki |
| 7,862,898 | B2 | 1/2011 | Sherman |
| 7,892,649 | B2 | 2/2011 | Sherman |
| 8,042,949 | B2 | 10/2011 | Taylor |
| 8,442,264 | B2 | 5/2013 | Rhoads |
| 2006/0182401 | A1 | 8/2006 | Risser |
| 2006/0216523 | A1 | 9/2006 | Takaki |
| 2007/0024822 | A1 | 2/2007 | Cortenraad |
| 2007/0082969 | A1 | 4/2007 | Malik |
| 2008/0304018 | A1* | 12/2008 | Tanis-Likkel ......... G03B 21/26 353/30 |
| 2009/0219253 | A1 | 9/2009 | Izadi |
| 2010/0060826 | A1 | 3/2010 | Duponchel |
| 2010/0066928 | A1 | 3/2010 | Pelfrey |
| 2010/0294679 | A1 | 11/2010 | Griffiths |
| 2011/0080553 | A1 | 4/2011 | Sun |
| 2011/0090162 | A1 | 4/2011 | Shih |
| 2012/0140147 | A1 | 6/2012 | Satoh et al. |
| 2012/0203560 | A1 | 8/2012 | Poulsen |

FOREIGN PATENT DOCUMENTS

| | | |
|---|---|---|
| EP | 2362384 | 8/2011 |
| GB | 1380714 | 1/1975 |
| GB | 2066992 | 7/1981 |
| JP | 2007095472 | 4/2007 |
| JP | 2011-107731 | 6/2011 |
| KR | 2011-0030410 | 3/2011 |
| KR | 2012-0084766 | 7/2012 |
| KR | 2012-0133391 | 12/2012 |
| WO | 02-39475 | 5/2002 |
| WO | 2009-150579 | 12/2009 |

OTHER PUBLICATIONS

Li, "Multifunctional window glazing", SPIE Newsroom, Mar. 19, 2008, 2 pages.

Mauer, Cholesteric Reflectors with a Color Pattern, Paper 26.1, 1994 SID International Symposium, Digest of Technical Papers, vol. XXV, May 1994, pp. 399-402.

Satoh, "80.2: 60-inch Highly Transparent See-through Active Matrix Display without Polarizers", SID Symposium Digest of Technical Papers, May 2010, vol. 41, No. 1, pp. 1192-1195.

Roberts, U.S. Appl. No. 13/675,130, entitled "Optical Stack Including Light Extraction Layer and Polymer Dispersed Liquid Crystal Layer", filed Nov. 13, 2012.

Wardhana, U.S. Appl. No. 13/675,121, entitled "Switchable Transparent Display," filed Nov. 13, 2012.

Weber, U.S. Appl. No. 13/948,382, entitled "Audio Encoding of Control Signals for Displays," filed Jul. 23, 2013.

* cited by examiner

ADDRESSABLE SWITCHABLE TRANSPARENT DISPLAY

TECHNICAL FIELD

This disclosure relates generally to illuminated display devices and to methods of operating such devices.

BACKGROUND

Display systems, such as digital signs, typically include an illumination device, such as a projector or backlit panel, and a display screen. During operation of the display system, the illumination device typically projects an image onto or through the display screen for presentation to viewers. The display screen can be a sheet-like optical device with a relatively thin viewing layer that is placed at an image surface of the illumination device.

Switchable display screens include polymer-dispersed liquid crystals that allow the illumination device to be transmitted or scattered in various sections by making the display screens or sections of the display screens transparent or diffuse depending upon the orientation states of the liquid crystals. The use of layered polymer-dispersed liquid crystals in display screens can increase the complexity of shapes that can be displayed, increase the number of haze levels, and allows the user to create patterns with fully clear and hazy sections simultaneously by stacking or layering patterned PDLC layers on top of one another.

Display systems can be used for advertising in malls, showrooms, exhibitions, and stores. Rear projection systems are one such example. A rear projection system includes at least a projection device (e.g. a three-color liquid crystal display projector that combines polarized light from different liquid crystal displays and emits combined light to form images) and a display screen. The projector can be configured to project an image within a limited projection area which may be a basic shape, such as a square or rectangle or other shape.

SUMMARY

Some embodiments are directed to a display system. The display system includes a switchable display screen comprising a first transparent substrate, a first transparent conductive layer disposed upon the first transparent substrate, a second transparent substrate, and a second transparent conductive layer disposed upon the second transparent substrate. The display screen further includes a polymer-stabilized cholesteric texture layer and spacer elements disposed between and in contact with the first transparent conductive layer and the second conductive layer, wherein the display screen comprises a plurality of addressable regions, each region capable of being switched from a transparent state to a diffuse state.

Some embodiments are directed to a display system comprising a switchable display screen that includes a plurality of addressable regions, each region capable of being switched from a transparent state to a diffuse state. An illumination device is configured to project light onto the switchable display screen. An image sensor is configured to capture a series of projected alignment content. A processing unit is electronically coupled to the image sensor and is configured to receive the series of captured alignment content and to align the projected light with at least one of the addressable regions that is in a diffuse state or at least one of the electrically-isolated regions that is in a transparent state.

Some embodiments involve a method of operating a switchable display system. One or more regions of a switchable display screen are switched from a transparent state to a diffuse state. The switchable display screen includes a first transparent substrate, a first transparent conductive layer disposed upon the first transparent substrate, a second transparent substrate, a second transparent conductive layer disposed upon the second transparent substrate, and a polymer-stabilized cholesteric texture layer and spacer elements disposed between and in contact with the first transparent conductive layer and the second conductive layer. Light is projected onto the one or more addressable regions that are in the diffuse state.

The above summary is not intended to describe each disclosed embodiment of every implementation of the present invention. The brief description of the drawings and the detailed description which follows more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
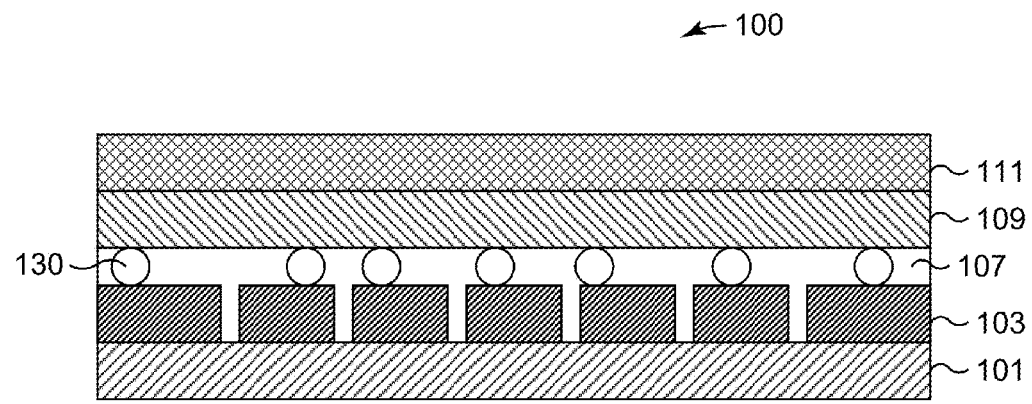
FIG. 1 shows a display screen that has patterned portions of a pattern first transparent conductor that provide individual pixel contacts and an unpatterned second transparent conductor that provides a common contact for the pixels according to some embodiments.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Digital signage is a relatively new industry that is largely dominated by liquid crystal display (LCD) televisions repurposed to display advertising content. However, there are many venues where it is undesirable to use these systems such as, for example, in a window of a storefront or refrigerated display case since such uses of LCD display screens could block valuable window space, limiting a customer's ability to see into the storefront. Additionally, it is desirable to use switchable images to attract consumer attention and to provide information to customers. Additional drawbacks of current LCD displayed digital signage include the complexity of switching shapes and messages on the display, the ease of manufacture and the flexibility for custom design.

The use of a switchable display screen comprising polymer-stabilized cholesteric texture (PSCT) layers allows the projected light from an illumination device to be or viewable in various regions by making the screen or screen sections transparent or diffuse depending upon the orientation states of the liquid crystals. The use of PSCT layers in display screens can increase the complexity of shapes that can be displayed, increase the number of haze levels, and allows the user to create patterns with fully clear and hazy sections simultaneously by stacking or layering patterned PSCT layers on top of one another. Display screens that include PSCT layers have a capability of higher transparency than conventional liquid-crystal display screens. Display screens that include PSCT layers can enable a large number of display shapes to be used and can enable displays that include x-y addressable arrays. Furthermore, in displays that include addressable arrays, images can be made that can move around the display screen. A continuing need exists for better display system that include display screens that can be more transparent, deliver dynamic messaging, and can be easily manufactured and at a relatively low price.

Polymer dispersed liquid crystal (PDLC) and polymer-stabilized liquid crystal (PSLC) systems have received much attention because of their potential utility for display applications. Adequate control of the phase separation between the liquid crystal and the polymer in these systems can be important to many commercial applications. The polymerization of a liquid crystal/monomer mixture at a temperature at which the liquid crystal and monomer are soluble but the liquid crystal/polymer is insoluble is described as polymerization induced phase separation (PIPS). The size of the formed liquid crystal phase can be controlled by polymerization kinetics. Traditional PDLC systems have been used for glazing in privacy window and automobile sunroof applications. One aspect of this technology is that the intrinsic refractive-index mismatch of polymers and liquid crystals can cause haze when the PDLC systems are in their transparent configuration—particularly at large viewing angles. As described below in various embodiments, displays have been developed that use polymer-stabilized cholesteric texture (PSCT) layers. The mix of materials in PSTC layers are better index-matched than PDLC layers resulting in systems that can have reduced haze when compared to PDLC layers.

Various embodiments of display systems for viewing projected content are described herein. The display systems include an illumination device configured to project light onto a switchable display screen that includes an array of addressable regions, also referred to herein as "pixels". The display screens can be "switchable" meaning that the addressable pixels can be changed from a transparent state to a diffuse state or vice versa.

FIG. 1 illustrates a cross section of a display screen 100 in accordance with some embodiments. The display screen 100 includes a first transparent electrical conductor 103 disposed upon a first substrate 101, and a second transparent electrical conductor 109 disposed upon a second substrate 111. The first and second transparent conductor 103, 109 may comprise one layer or multiple layers, wherein at least one of the layers is a transparent electrical conductor. In some implementations, the first transparent electrical conductor 103 comprises one or more layers at least one of which is a transparent electrical conductor disposed on the first substrate 101 and the second transparent electrical conductor 109 comprises one or more layers at least one of which is a transparent electrical conductor disposed on the second substrate 111. Optionally, one or more layers of non-electrically conductive transparent material may be disposed between the transparent electrical conductor 103, 109 and the substrate 101, 111, for example.

A first polymeric liquid crystal composition 107 that includes first spacer elements 130 can be disposed between and in contact with the first transparent electrical conductor 103 and the second transparent electrical conductor 109. The spacer elements may comprise a variety of structures configured to space apart the first transparent conductor layer from the second transparent conductor layer. For example, the spacer elements may include structures such as spacer beads, post spacers, polymeric walls, polymeric cells, and so forth. The first polymeric liquid crystal composition 107 includes a polymer-stabilized cholesteric texture layer. In the display screen 100 shown in FIG. 1, the patterned portions of the transparent conductor 103 provide pixel contacts, with the unpatterned transparent conductor 109 providing a common contact for the pixels. A voltage applied between a patterned pixel contact of the transparent conductor 103 and the unpatterned transparent conductor 109 can cause the polymeric liquid crystal composition 107 to switch from one state to another state in the region of the patterned portion, e.g., to switch from diffuse state to a transparent state.

The substrates can be formed of any useful material such as, for example, glass or polymer. In many embodiments, at least one substrate can be transparent to at least some portion of the visible light spectrum. Typically, both substrates are transparent to most of the visible light spectrum. In many embodiments, the substrates are formed from a suitable polymeric material that has sufficient mechanical properties (e.g., strength and flexibility) to be processed in a roll-to-roll apparatus. By roll-to-roll, what is meant is a process where material is wound onto or unwound from a support, as well as further processed in some way. Examples of further processes include coating, slitting, blanking, and exposing to radiation, or the like. Examples of such polymers include thermoplastic polymers. Exemplary thermoplastic polymers include polyolefins, polyacrylates, polyamides, polyimides, polycarbonates, polyesters, and biphenol- or naphthalene-based liquid crystal polymers. Further examples of thermoplastics include polyethylenes, polypropylenes, polystyrenes, poly(methylmethacrylate)s, polycarbonates of bisphenol A, poly(vinyl chloride)s, polyethylene terephthalates, polyethylene naphthalates, and poly(vinylidene fluoride)s. Some of these polymers also have optical properties (e.g., transparency) that can make them especially well-suited for certain display applications wherein they support a patterned conductor, such as polycarbonates, polyimides, and/or polyesters.

The substrates can be flexible. The substrates can have any useful thickness, ranging in general from about 5 µm to about 1000 µm, from about 25 µm to 500 about µm, from about 50 µm to about 250 µm, or even from about 75 µm to 200 about µm.

Exemplary transparent electrical conductors can be made of indium-tin oxide, antimony-tin oxide, fluorine doped tin oxide, doped zinc oxide, graphene, polyacetylenes, polyanilines, polypyrroles, polythiophenes, poly (3,4-ethylenedioxythiophene) [PEDOT]: poly(styrene sulfonate) PSS, nanowires, and doped poly(4,4-dioctylcyclopentadithiophene). The range of transparency in the visible spectrum of these transparent conductors varies but, depending upon the application, each may be used to make the display screens described herein.

Cholesteric liquid crystals are, typically, dispersed or stabilized in a polymeric matrix to form polymer-stabilized cholesteric textures. The polymer-stabilized cholesteric textures can include cholesteric liquid crystals which are chiral in nature (e.g., molecules that do not possess a mirror plane) and molecular units that are mesogenic in nature (e.g., molecules that exhibit liquid crystal phases). In some embodiments, the cholesteric liquid crystal materials can, themselves, be polymers. Cholesteric liquid crystal materials may also include achiral liquid crystal compounds (nematic) mixed with or containing a chiral unit. Cholesteric liquid crystal materials include compounds having a cholesteric liquid crystal phase in which the director (the unit vector that specifies the direction of average local molecular alignment) of the liquid crystal rotates in a helical fashion along the dimension perpendicular to the director. Cholesteric liquid crystal materials are also referred to as chiral nematic liquid crystal materials. The pitch of the cholesteric liquid crystal material is the distance (in a direction perpendicular to the director and along the axis of the cholesteric helix) that it takes for the director to rotate through 360 degrees. This distance is generally 100 nm or more.

Figure 2:
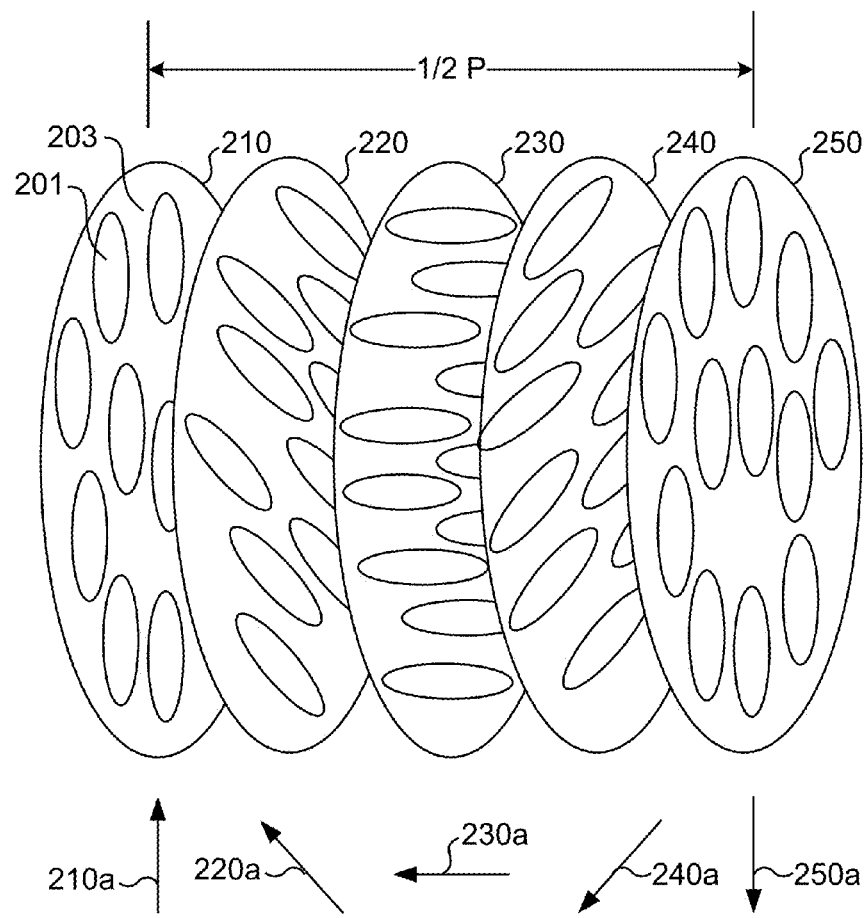
FIG. 2 illustrates five different alignment orientations of nematic layers of liquid crystals.

A cholesteric liquid crystal phase is typically composed of a plurality of planes containing nematic mesogenic molecules (aligned in a plan parallel manner) that contain a chiral center which produces intermolecular forces that favor alignment between molecules in adjacent planes to be at a slight rotational angle to one another. This leads to the formation of a structure that can be visualized as a stack of very thin two-dimensional nematic-like layers each having a director (alignment vector) twisted with respect to those in the layer above and below. FIG. 1 is an illustration showing the alignment of a cholesteric liquid crystal phase having a stack of nematic layers of liquid crystals. For illustrative purposes only five different alignment orientations of nematic layers are shown in FIG. 2. Each nematic layer 210, 220, 230, 240, and 250 includes aligned liquid crystal elements 201 stabilized by polymer matrix 203. In nematic layer 210, the director is approximately vertical to the illustration as shown by arrow 210a due to the alignment of the liquid crystal elements in that layer. The illustrated cholesteric liquid crystal includes nematic layers 220, 230, and 240 with directors turned approximately 45 degrees as shown by arrows 220a, 230a, and 240a. Nematic layer 250 has a director, indicated by arrow 250a, that is antiparallel with the director 210a of nematic layer 210. The distance between nematic layers that have directors that have made a 360 degree turn is called the pitch of the cholesteric liquid crystal. In FIG. 2, one-half the pitch is the distance between layer 210 and 250.

Polymer-stabilized cholesteric texture (PSCT) layers typically have a stabilizing polymer concentration that is below about 10% by weight. In contrast, polymer-dispersed liquid crystal (PDLC) layers can have a polymer concentration of from 20% to about 80% by weight to confine the liquid crystals. Because of this high polymer content, PDLC layers typically are inherently hazy due to index-mismatching of the polymer and the liquid crystal. This index-matching problem can be eliminated in PSCT layers since the polymer concentration is typically low. PSCT layers typically are haze-free even at wide viewing angles when they are in their transparent mode.

The polymer-stabilized cholesteric texture layers discussed herein can be derived from photocurable or thermally-curable compositions that include a mixture of at least one nematic liquid crystal, a chiral compound, and a pre-polymer formulation. Pre-polymer formulations (curable compositions) for PSCT layers are described, for example, in Fuh, A., et al., "Studies of Polymer-Stabilized Cholesteric Texture Films", *Display Technologies III, Proc. Of SPIE Vol.* 4079, 184 (2000). This reference discloses exemplary PSCT films made using a mixture of nematic E48 and chiral CB15 (both available from E. Merck, Darmstadt, Germany) in a ratio of 92:8 photopolymerized in the presence of 2.7% by weight of bis[6-(acryloyloxy)hexyloxy]-1,1'-biphenylene and a photoinitiator.

The polymer-stabilized cholesteric texture layer can be disposed between the first substrate and the second substrate. Typically, the polymer-stabilized cholesteric texture layer is in contact with one or both of the transparent conductors. The polymer-stabilized cholesteric texture layers can include a liquid crystal phase dispersed (disperse phase) within a polymeric matrix (continuous phase) along with a chiral dopant. The polymer-stabilized cholesteric texture layer that can be disposed between substrates can have any useful thickness such as, for example, a thickness in a range from about 1 µm to about 15 µm. The polymer-stabilized cholesteric texture layer can be formed via radiation curing by exposure to actinic radiation (typically UV radiation) in a range of from about 0.1 mW/cm$^2$ to about 30 mW/cm$^2$ or in a range of from about 0.2 mW/cm$^2$ to about 20.0 mW/cm$^2$.

The polymerization of the photocurable or thermally curable compositions can be initiated photochemically or thermally. Photochemically initiated photopolymerization typically requires an initiator. In many embodiments, the photoinitiator includes hydroxy-alkylbenzophenones (e.g., DAROCUR available from Merck), benzoin ethers, alkylphenones, benzophenones, xanthones, thioxanthones, phosphine oxides (e.g., IRGACURE 819 available from Ciba Specialty Chemicals), and their derivatives. Additional useful photopolymerization initiators are described in U.S. Pat. No. 5,516,455 (Jacobine et al). The photopolymerization initiator can be present in the composition in any useful amount. In many embodiments, the photo polymerization initiator can be present in a range from about 0.01 wt % to about 10 wt %, from about 0.1 wt % to about 5 wt %, or from about 1 wt % to about 2 wt %. Thermal initiators for curable compositions are well known in the art and include peroxide and azo compounds.

Polymeric matrix component generally includes at least one optically clear polymeric material. The optically clear polymeric material may include at least one adhesive. Adhesives can be useful for adhering together adherends and exhibit properties such as: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power.

Useful polymer matrix components include poly(meth)acrylate compositions derived from: monomer A comprising at least one monoethylenically unsaturated alkyl (meth)acrylate monomer, wherein a homopolymer of the monomer has a $T_g$ of no greater than about 0° C.; and monomer B comprising at least one monoethylenically unsaturated free-radically copolymerizable reinforcing monomer, wherein a homopolymer of the monomer has a $T_g$ higher than that of monomer A, for example, at least about 10° C. As used herein, (meth)acrylic refers to both acrylic and methacrylic species and likewise for (meth)acrylate.

In some embodiments, the optically clear polymeric material can include natural rubber-based and synthetic rubber-based adhesives, thermoplastic elastomers, tackified thermoplastic-epoxy derivatives, polyurethane derivatives, polyurethane acrylate derivatives, silicone adhesives such as polydiorganosiloxanes, polydiorganosiloxane polyoxamides and silicone urea block copolymers.

In some embodiments, the optically clear polymeric material can include a composition having high light transmittance of from about 80% to about 100%, from about 90% to about 100%, from about 95% to about 100%, or from about 98% to about 100% over at least a portion of the visible light spectrum (about 400 to about 700 nm), and/or a haze value of from about 0.01% to less than about 5%, from about 0.01% to less than about 3%, or from about 0.01% to less than about 1%. Exemplary optically clear polymeric materials that are adhesives include tackified thermoplastic epoxies as described in U.S. Pat. No. 7,005,394 (Ylitalo et al.), polyurethanes as described in U.S. Pat. No. 3,718,712 (Tushaus), polyurethane acrylates as described in U.S. Pat. Appl. Publ. No. 2006/0216523 (Takaki et al.).

In some embodiments, the optically clear polymeric material may include the cured reaction product of a multifunctional ethylenically unsaturated siloxane polymer and one or more vinyl monomers as described in U.S. Pat. Nos. 7,862,898 and 7,892,649 (both Sherman et al.). An exemplary optically clear polymeric material that is an adhesive includes a polymer derived from an oligomer and/or monomer comprising polyether segments, wherein from 35% to 85% by weight of the polymer comprises the segments. These adhesives are described in U.S. Pat. Appl. Publ. No. 2007/0082969 (Malik et al.). The optically clear polymeric material can optionally include one or more additives such as nanoparticles, plasticizers, chain transfer agents, initiators, antioxidants, stabilizers, viscosity modifying agents, and antistats.

The optically clear polymeric material can be at least partially cured or crosslinked in order to raise the storage modulus of the polymer network and stabilize the morphology of the polymeric liquid crystal composition. The optically clear polymeric material can be crosslinked using thermally or photochemically initiated using well known free-radical or cationic initiators. For example, the optically clear polymeric material can be NORLAND OPTICAL ADHESIVE 65, available from Norland Products, Inc., Cranbury, N.J. which is photocurable using ultraviolet radiation. The art of crosslinking polymeric systems, such as acrylics, is well known to those of ordinary skill in the art.

The optically clear polymeric material may include nanoparticles that can modify the refractive index or affect the mechanical properties of the optically clear polymeric material. Suitable nanoparticles have sizes such that the particles produce the desired effect without introducing significant amount of scattering into the optically clear polymeric material.

The optically clear polymeric material can also include spacer elements that can provide a gap to maintain a specified distance between the first transparent conductor and the second transparent conductor. Spacer elements can be made of inorganic glasses, ceramics, or organic polymers. They are well known to those of ordinary skill in the art. Typically, the spacer elements are present in the optically clear polymeric material composition in an amount of from about 0.5 wt % to about 5 wt %, from about 1 wt % to about 3 wt %, or even from about 2 wt % to about 3 wt %. A useful exemplary spacer element is the MICRO PEARL SP spacer bead, available from Sekisui Chemical Co., Ltd., Osaka, Japan. The diameter of the spacer element can determine the gap between the first transparent conductor and the second transparent conductor. It also can determine the thickness of the polymeric liquid crystal composition in the system. The combination of the first layer (that includes a first transparent conductor) and the second layer (that includes a second transparent conductor) having a gap (that includes the polymeric liquid crystal composition) acts like a capacitor. The strength of an electric field in a capacitor depends upon the distance between the two transparent conductors and the voltage applied between the two electrodes. By changing the electric field in a display screen it is possible, under some conditions, to get intermediate levels of haze.

Figure 3:
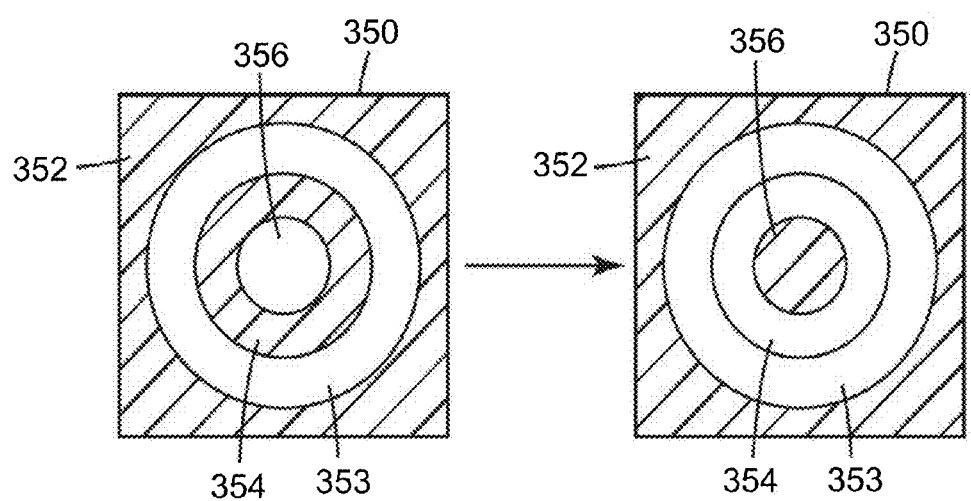
FIG. 3 illustrates a display screen having a number of pixels in the transparent state and a number of pixels in the diffuse state in accordance with some embodiments.

The display may comprise x-y addressable pixels, each x-y addressable pixel having at least one x-y accessible patterned pixel contact. Each x-y addressable pixel is capable of being switched so as to change the polymer-stabilized cholesteric texture layer proximate to the x-y addressable pixel contact from a transparent state to a diffuse state (also referred to herein as hazy state). FIG. 3 illustrates a display screen 350 having a number of pixels in the transparent state and a number of pixels in the diffuse state. A transparent display screen 350 in a first configuration, shown on the left in FIG. 3, has one or more x-y addressable pixels in a background portion 352 and one or more x-y addressable pixels in a ring portion 354, both set to a diffuse state, while one or more x-y addressable pixels in a ring portion 353 and one or more x-y addressable pixels in a center portion 356 are set to a transparent state. The display screen 350 can be controlled to change to a second configuration, shown on the right in FIG. 3. In the second configuration, the pixels in the diffuse and transparent states are changed from the first configuration. Pixels in background portion 352 are still set to the diffuse state and pixels in 353 are still set to a transparent state, but pixels in ring portion 354 are now set to a transparent state while pixels in center portion 356 are set to a diffuse state.

One or both of the first transparent conductor or the second transparent conductor can be patterned. In the x-y addressable display screens according to various embodiments discussed herein, the patterning of the first transparent conductor provides pixel contacts that allow electrical access to an array of x-y addressable pixels through the patterned first transparent conductor and an unpatterned, common second transparent conductor. In some applications, a transparent conductor that is patterned can include a transparent conductor disposed upon a transparent substrate, wherein the transparent conductor includes at least two sections that are electrically-isolated from each other. The electrically-isolated sections have separate electrical leads attached to them so that they can be selectively and separated energized as desired to form a complex display.

Figure 4:
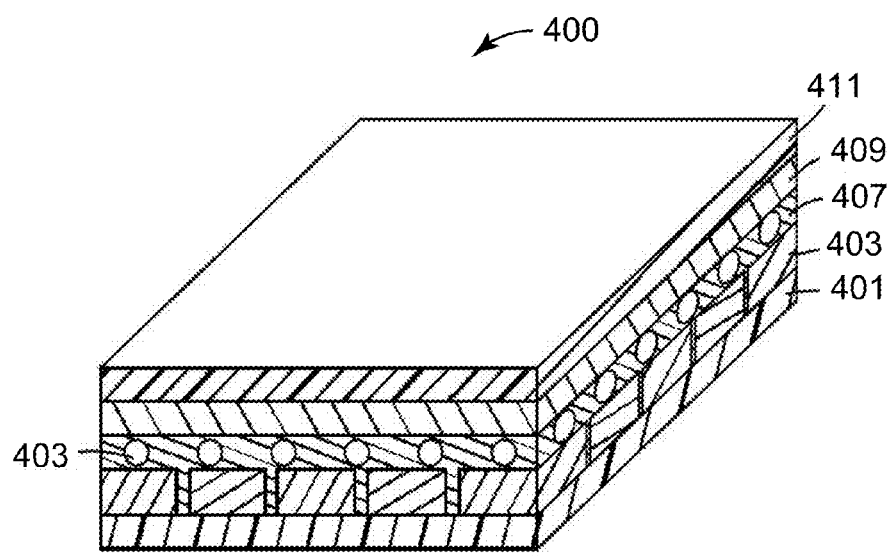
FIG. 4 provides a perspective drawing of an embodiment of a display screen that includes 25 individually-addressable pixels arranged in a 5×5 array.

FIG. 4 provides a perspective drawing of an embodiment of a display screen 400 useful in a display system. The display screen includes 25 individually-addressable pixels arranged in a 5×5 array. The display screen 400 illustrated in FIG. 4 has patterned first transparent conductor 403 that has been etched or otherwise formed into 25 regions in an x-y array disposed upon first transparent substrate 401. Unpatterned second transparent conductor 409 is disposed upon second transparent substrate 411. Polymer-stabilized cholesteric texture layer 407 containing spacer elements 403 is disposed between and in contact with patterned first transparent conductor 403 and unpatterned second transparent conductor 409. Individual electrical connections that address each of the 25 pixels (not visible in drawing) have been etched or otherwise formed in the gaps between the regions of the patterned first transparent conductor 403.

Figure 5:
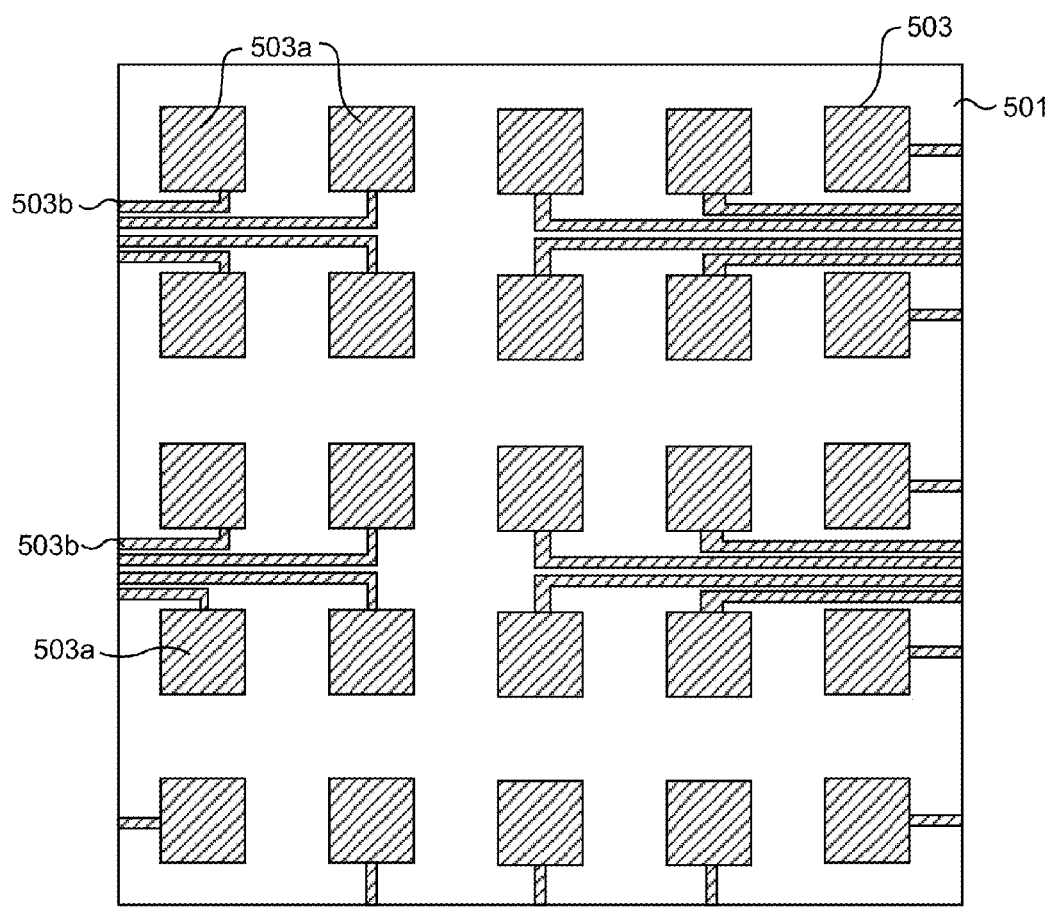
FIG. 5 depicts a plan view portion of a display screen including a patterned first transparent conductor disposed on a first substrate.

FIG. 5 depicts a plan view of a portion of a display screen capable of activating 25 individually addressable pixels. FIG. 5 shows a patterned first transparent conductor 503 disposed on a first substrate 501. The patterning of the first transparent conductor 503 forms an array of 25 pixel contacts 503a and 25 individual electrical connections 503b formed in the gaps between the pixel contacts 503a. Each pixel contact 503a is separately addressable through an electrical connection 503b in this embodiment. The separately addressable pixel contacts formed by the first transparent conductor can be used in conjunction with an unpatterned second transparent conductor.

Figure 6A:
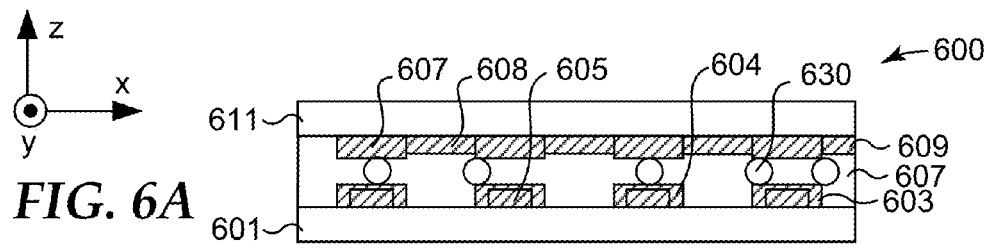
FIG. 6A diagrammatically illustrates a side view of a display screen configured as a passive matrix having 16 pixels arranged in a 4×4 x-y addressable array in accordance with some embodiments.
Figure 6B:
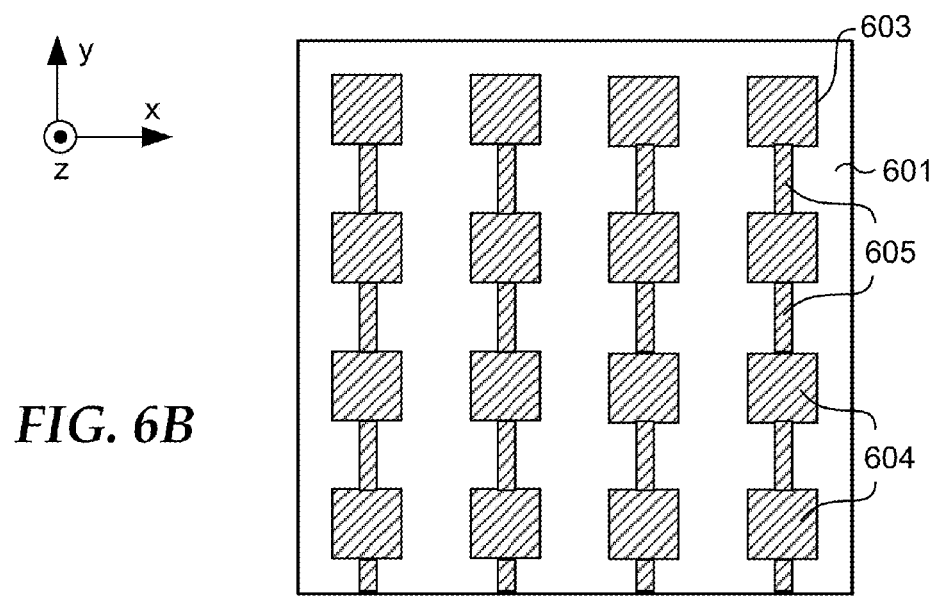
FIG. 6B depicts a plan view of the first transparent conductor disposed upon a first substrate of the display screen of FIG. 6A.
Figure 6C:
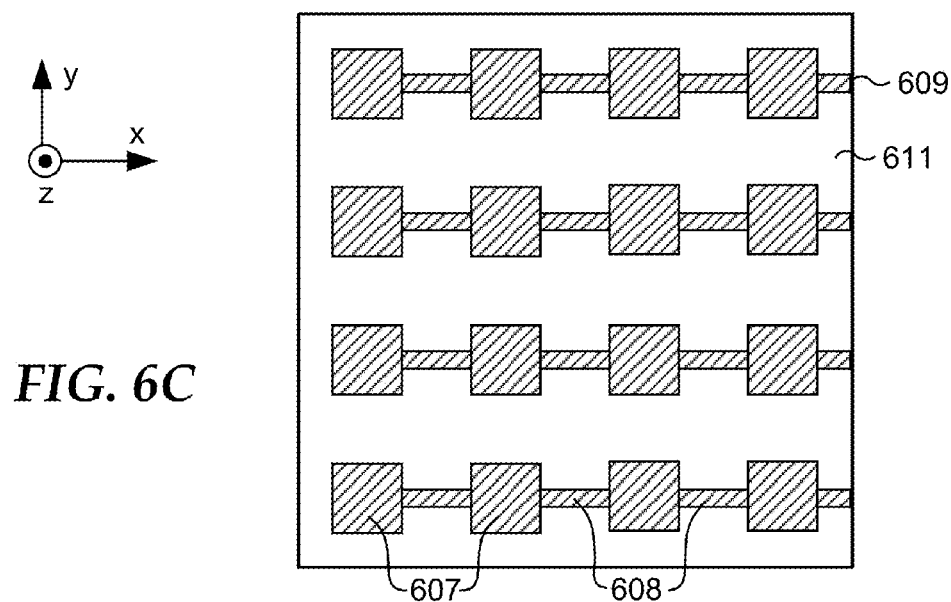
FIG. 6C depicts a plan view of the patterned second transparent electrical conductor disposed upon the second substrate of the display screen of FIG. 6B.

Display screens described herein according to some embodiments may be passive matrix driven (passive matrix displays). In some configurations, it is convenient for passive matrix displays to include a grid or array of electrical connections, e.g., a grid of horizontal (x) and vertical (y) electrical connections that can address a pixel at the intersection of those electrical connections. Although an array of x-y addressable pixels can be arranged substantially rectilinearly, as shown in FIGS. 6A-6C, for example, other arrangements of arrays of x-y addressable pixels are within the scope of this disclosure. For example, the pixel array can have pixels addressable at skewed angles such as those in a parallelogram or other non-rectilinear shapes or in a variety of two-dimensional or three-dimensional shape.

FIG. 6A diagrammatically illustrates a side view of a display screen 600 usable as a passive matrix display having 16 pixels arranged in a 4×4 x-y addressable array in accordance with some embodiments. The display screen 600 includes a patterned first transparent conductor 603 disposed upon a first substrate 601, and a second patterned transparent electrical conductor 609 disposed upon a second substrate 611. The first transparent conductor 603 is patterned to form first pixel contacts 604 and electrical connections 605 disposed in gaps between the first pixel contacts 604. The electrical connections 605 electrically connect the first pixel contacts 604 in rows along the x axis in this example. The second transparent conductor 609 is patterned to form second pixel contacts 607 and electrical connections 608 disposed in gaps between the second pixel contacts 607 The electrical connections 608 electrically connect the second pixel contacts 607 in columns of along the y axis. A polymeric liquid crystal composition 607 that includes first spacer elements 630 is disposed between and in contact with the transparent electrical conductor 603 and the second transparent electrical conductor 609. The polymeric liquid crystal composition 607 includes a polymer-stabilized cholesteric texture layer.

FIG. 6B depicts a plan view of the first transparent conductor 603 disposed upon a first substrate 601. The first transparent conductor 603 is patterned to form first pixel contacts 604 and electrical connections 605. The electrical connections 605 electrically connect the first pixel contacts 604 in columns along the y axis. It will be appreciated that although electrical connections 605 are shown in FIGS. 6A and 6B to have a different width along the y axis and height along the z axis than the first pixel contacts 604, it will be appreciated that in some configurations, the pixel contacts and the electrical connections may have the same width and/or height.

FIG. 6C depicts a plan view of the patterned second transparent electrical conductor 609 disposed upon the second substrate 611. The second transparent conductor is patterned to form second pixel contacts 607 and electrical connections 608. The electrical connections 608 electrically connect the second pixel contacts 607 in rows along the x axis. It will be appreciated that although electrical connections 608 are shown in FIGS. 6A and 6C to have a different width along the x axis and height along the z axis than the pixels 607, it will be appreciated that in some configurations, the pixel contacts and the electrical connections may have the same width and/or height.

Figure 7:
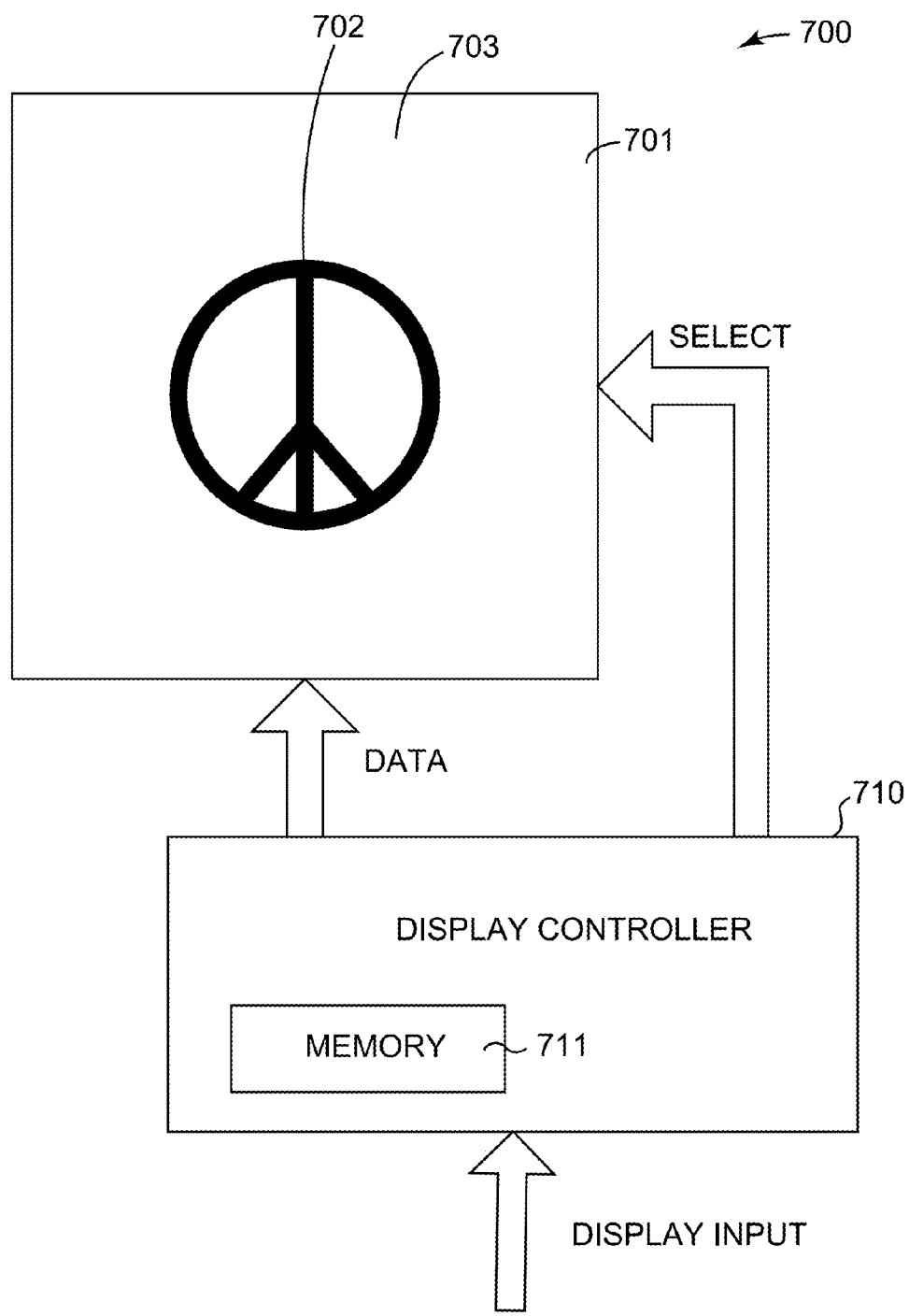
FIG. 7 is a block diagram of a display system that incorporates a display screen, e.g., (such as the display screens described in connection with FIG. 1, 3, 4, 5, or 6) and a display controller.

As shown in FIG. 7, in some embodiments, a display system 700 incorporates a display screen 701, e.g., (such as the display screens described in connection with FIG. 1, 3, 4, 5, or 6) and a display controller 710. The display controller 710 is configured to generate electrical signals that transfer digital data corresponding to images, e.g., still images or moving images (video), to the display screen 701. The digital data corresponding to the images can be input to the display controller 710 from an external device, e.g., host computer, and/or may be stored in the memory 711 of the display controller 710. An image may be formed on the display screen 701 by a first group of pixels 703 that are in a transparent state and a second group of pixels 702 that are in a diffuse state.

For example, when used with a display screen such as display screen 600 shown in FIG. 6A, the display controller 710 can transfer digital data using the row electrical connections 609 as select lines and the column electrical connections 605 as data lines. In such an implementation, the display controller 710 is configured to generate and apply a select signal to the row electrical connections 609 to select pixels in the row. While the row is selected, the display controller 710 generates and applies data signals to the column electrical connections 605. The data signals transfer a portion of the digital data corresponding to the still image or video to the selected row of pixels. The display controller 710 generates signals that sequentially select each of the rows of pixels and transfers the digital data corresponding to the still image or video to the sequentially selected rows of pixels.

Figure 8:
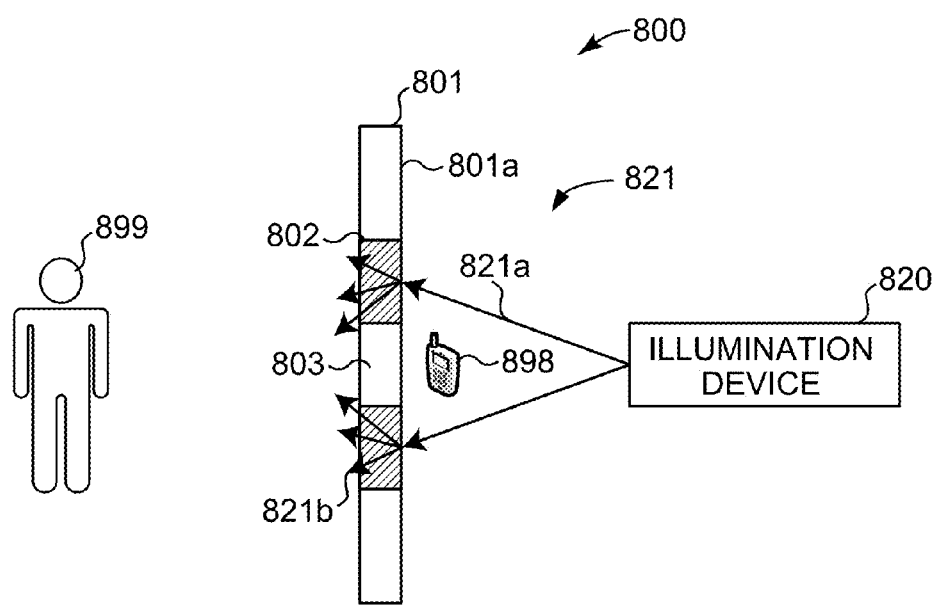
FIG. 8 is a block diagram of a display system that includes an illumination device, such as a projector, configured to generate and project light onto or through a switchable display screen.

As shown in FIG. 8, in some embodiments, a display system 800 includes an illumination device 820, e.g., a rear projector, configured to generate and project light 821 onto and/or through a switchable display screen 801. In some configurations, light 821a is projected from the illumination device 820 towards the rear 801a of the display screen 801 and onto the diffuse portions 802 of the display screen 801. The diffuse portions 802 scatter the light allowing some of the scattered light 821b to exit the front 801b of the display screen 801. The scattered light 821b exiting the front 801b of the display screen 801 is observable by observer 899 positioned proximate the front of the display screen. In some configurations, the projection from the illumination device 820 includes dark regions corresponding to the transparent portions 803 of the display screen 801, these projected dark regions serve to reduce transmission of light through the transparent portions 803 of display screen. In some embodiments, a product 898 may be positioned so that the product 898 is observable by observer 899 through the transparent portion 803.

In front projection embodiments, light is projected from an illumination device towards the front of the display screen and onto the diffuse portions of display screen. The light directed toward the diffuse portions at the front of the display screen are observable by an observer standing at the front of the display screen.

When in a transparent state, light projected onto the display screen will travel through all of the pixels that are in a transparent state. When in a diffuse state, light projected onto the display screen will be scattered from the pixels that are in a diffuse state. Each pixel can be switched from a stable transparent state to a stable diffuse state or from a stable diffuse state to a stable transparent state. The semi-bistability of the PCST layer provides hysteresis in the threshold switching voltages needed to change the state of the pixels, allowing passive matrix addressing to be used to drive the pixels. Due to the switching voltage hysteresis, the threshold voltage needed to switch from the transparent state to the diffuse state is different from the threshold voltage needed to switch from the diffuse state to the transparent state.

The display screens according to the embodiments discussed herein are useful in display systems that include an illumination device for projecting light onto the display screen. The display system may be used to form a shaped display, wherein the shape of the display can be provided by one or more of 1) the shape of a group of addressable pixels in a diffuse state, 2) the shape of a group of addressable pixels in a transparent state, 3) the shape of an image projected onto the display screen.

The group of addressable pixels that are in their diffuse state can define a shape and the illumination device can project an image onto the display screen displaying that image only on the pixels that are in the diffuse state. In some embodiments, an illumination device can be positioned to project light through the display screen (rear projection). In these embodiments, it is possible that a projected image will be scattered by pixels in the diffuse state. In this embodiment, light that is scattered by the pixels in the diffuse state would be visible when viewed from the front of the display screen. In this embodiment, the group of addressable pixels that are in their transparent state or the group of addressable pixels that are in their diffuse shape can define the shape of the display. Any arrangements of projected images and transmission or scattering of the image formed by either the transparent pixels or the diffuse pixels on the switchable display screen are contemplated by this disclosure.

In some embodiments, the shaped display is formed by projected light from the illumination device that has shaped content from being projected through a physical or virtual mask or by direct rastering. Shaped content can be any image that has a shape, such as the shape of a commercial product, a trademark, a logo, and/or alphanumeric characters. The shaped content of the projected light can change over time, particularly when the projected light from the illumination device is passed through a virtual mask. In some embodiments, the shaped content of the projected light can be synchronized with the diffuse state of one or more pixels of an array of addressable pixels. In some embodiments, the shaped content of the projected light can substantially match the shape of a group of addressable regions or pixels in the display screen that are in the diffuse state. In some embodiments, when the shaped content of the projected light changes, the shape of the group of addressable regions or pixels can change from a transparent state to a diffuse state or from a diffuse state to a transparent state in synchronization with the changes in the shaped content of the projected light.

Figure 9A:
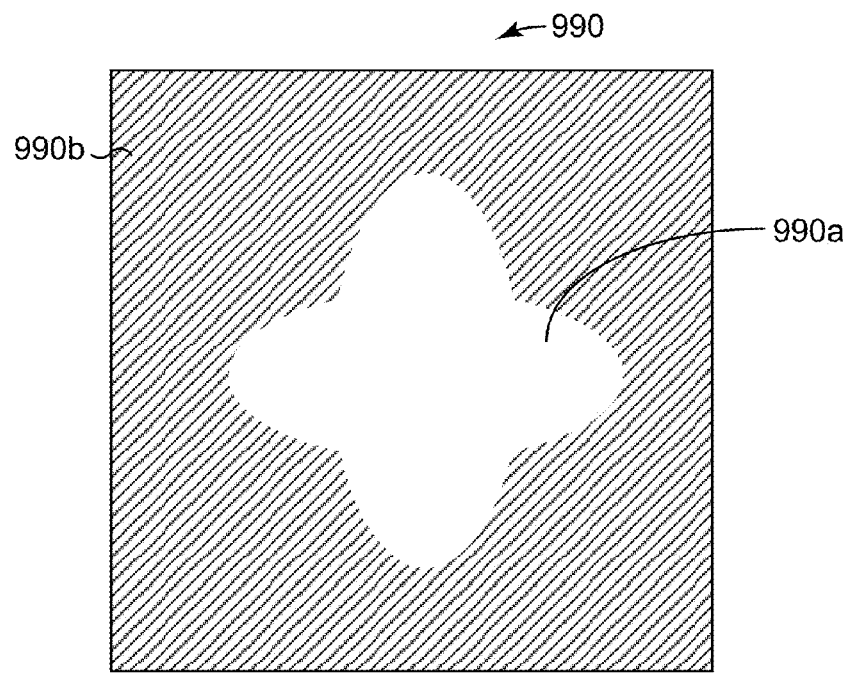
FIG. 9A shows a surface view of a physical mask that has one or more regions that transmit light and one or more regions that block light.
Figure 9B:
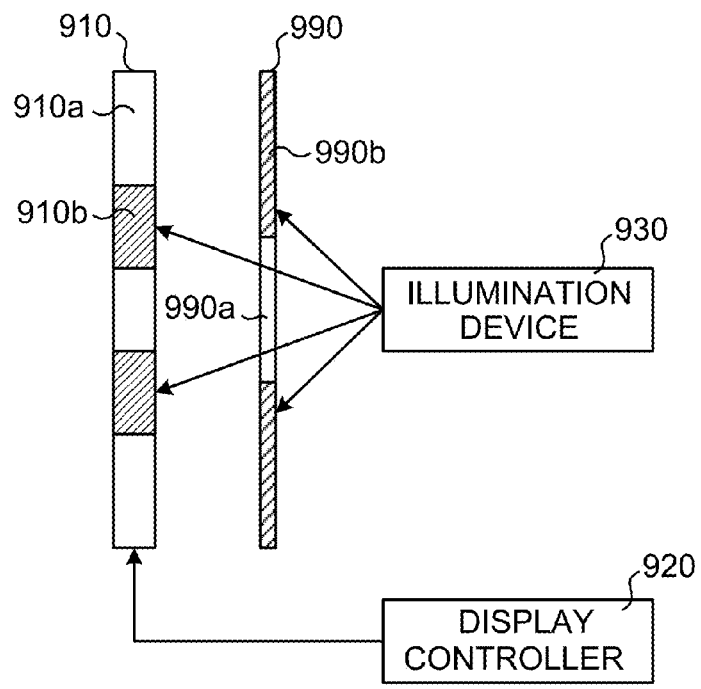
FIG. 9B is a block diagram of a display system with the mask of FIG. 9A inserted between the illumination device and the display screen.

A shaped display can have the shape that is defined by the image projected onto the display screen through a mask. In some embodiments, the mask can be a physically cut-out region in a physical mask. As shown in FIGS. 9A and 9B, the shape of the image from the illumination device 930 can be at least partially defined by passing light from the illumination device 930 through a physical mask 990. FIG. 9A shows a surface view of a physical mask 990 that has one or more transparent regions 990a that transmit light and one or more diffuse regions 990b that scatter light. FIG. 9B shows a display system 900 with the mask 990 inserted between the illumination device 930 and the display screen 910. The mask 990 blocks a first portion of the light emitted by the illumination device 930 and transmits a second portion of the light emitted by the illumination device. The display system 900 shown in FIG. 9B includes a controller 920 electrically coupled to the display screen 910. The controller 920 generates signals that control the state of the diffuse 910b and transparent 910a regions of the display screen 910.

Figure 10:
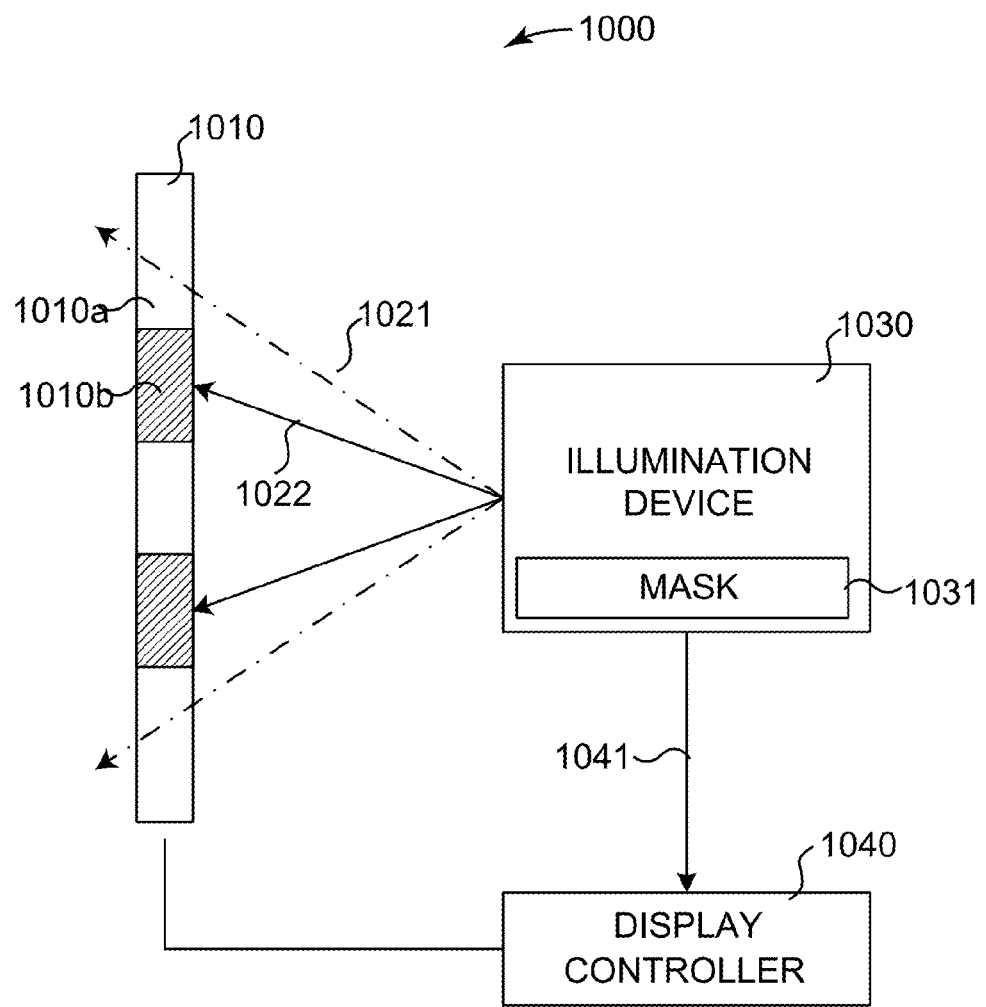
FIG. 10 is a block diagram of a display system that includes an illumination device capable of projecting a static or dynamic image that has substantially the same shape as the display screen or otherwise matches the projected image to a shape of the transparent or diffuse sections of the display screen.

In some other embodiments, as depicted in FIG. 10, a display system 1000 includes an illumination device 1030 capable of projecting a static or dynamic image that has substantially the same shape as the display screen 1010 or otherwise matches the projected image to a shape of the transparent 1010a or diffuse 1010b sections of the display screen 1010. In this embodiment, the display system 1000 includes a virtual mask 1031 that may be stored in the illumination device or elsewhere. A virtual mask 1031, such as a digital mask, can exist as a stored data pattern. The virtual mask 1031 substantially blocks portions of an image that are projected outside of the display screen shape. The portion of the image that is blocked by the digital mask is illustrated in FIG. 10 as dashed lines 1021 and the portion of the image that is not blocked by the digital mask is illustrated as solid lines 1022.

The shaped content of the projected light can change over time. In some embodiments, the shaped content of the projected light can be synchronized with the diffuse state of one or more pixels. In these embodiments, synchronization signals 1041 may be used to synchronize the operation of the illumination device 1030 and the display controller 1040. The shaped content of the projected light can substantially match the shape of a group of addressable regions or pixels in the display screen that are in the diffuse state. In some implementations, the shape of the group of addressable regions or pixels can change from a transparent state to a diffuse state or from a diffuse state to a transparent state in synchronization with the changes in the shaped content of the projected light.

In one embodiment, the virtual mask defines a main image area that defines a shape substantially corresponding to the shape of the display screen, and a region outside of the main image area is filled with light limiting content, such as a uniform black color or printed graphics. For example, the mask may fill the region of the projection area outside of the main image area with a light absorbing color (e.g., black), such that the projector projects black outside of the display screen. An image file (e.g., a video file) that incorporates the virtual mask may be inputted into the projector for projecting onto the display screen. In one embodiment, the virtual mask is incorporated as a layer of the image projected by the display screen. The virtual mask and the display screen can be created based on a virtual shape template that defines the desired shape for the display screen. In some embodiments, the virtual mask and the display screen are created based on the same virtual shape template. In these embodiments, a common virtual shape template defines the desired shape for the display screen and the desired shape for the main image area of the mask. In some embodiments, the virtual shape template includes a vector outline that defines the desired shape. A virtual shape template comprising a vector outline or another type of vector-based graphic may be useful because vector-based graphics may be scaled to any suitable size without substantial degradation of resolution.

The projected light of a display system can be synchronized with the diffuse state of at least one of the plurality of x-y addressable pixels of an array of x-y addressable pixels in a diffuse state using low bandwidth synchronization or high bandwidth synchronization. In many embodiments, the projected light of a display system can be synchronized with the plurality of x-y addressable pixels that form an image at any instant in time. Low bandwidth synchronization of an image displayed by the plurality of addressable pixels with projected content of light in a display system can include the use of audio tones or encoding of each frame of a displayed image as a graphical interface format. The use of graphical interface format information with a changing display image requires that only the data for the changing pixels needs to be sent to the display screen, allowing for low bandwidth requirements.

Some implementations involve encoding a control signal for the display screen that uses audio tones. For example, the control signal can be sine or square waves with the frequency of the waves determining the data set being sent. The frequency can be in the ultrasonic range to send data faster and free the audio line for traditional use of providing audio with video. This signal can also be a series of DTMF (dual-tone multi-frequency) tones. Each tone, or series of tones, can represent a different set of data. Using stereo audio allows for more data to be transmitted or for error correction to be performed. The control signal can be used to encode the pixel data in x-y addressable transparent displays.

Figure 11:
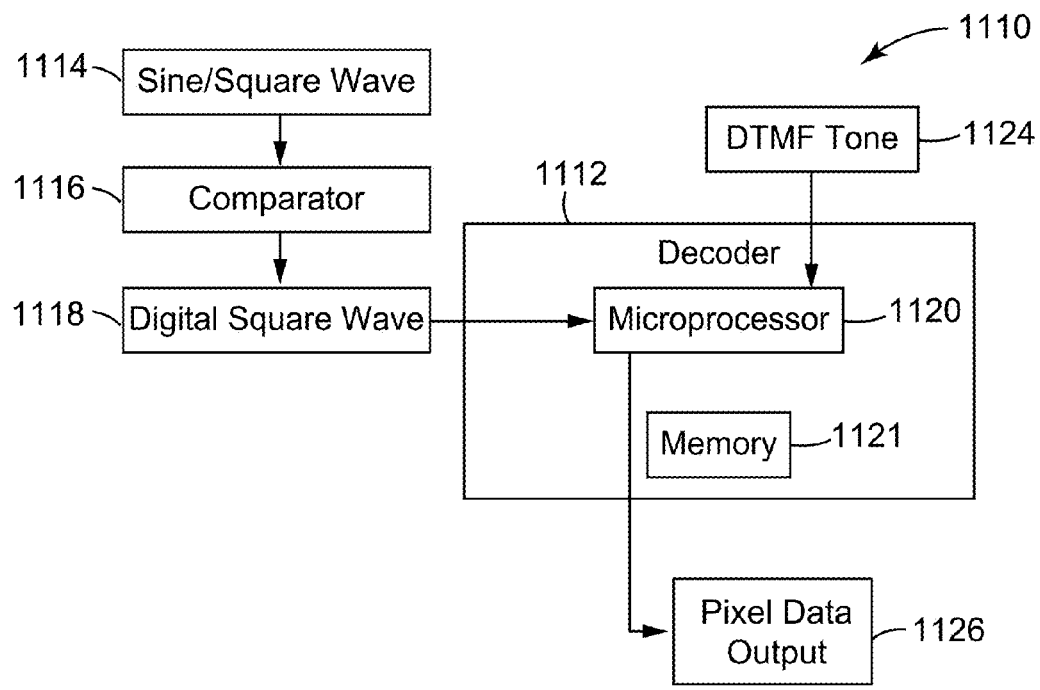
FIG. 11 is a block diagram of a system for audio encoding of data.

FIG. 11 is a block diagram of a system 1110 for audio encoding of data. System 1110 includes a decoder 1112 for decoding audio signals to provide a synchronization signal for an addressable display as discussed herein. Decoder 1112 includes a processor 1120, or controller or circuitry, for decoding signals. A memory 1121 can store software instructions for execution by processor 1120. The audio signal can be square waves with the frequency of the waves determining the active (diffuse) pixels. The audio signal can also be a sine wave. Pixel information can be encoded in sine waves using several methods. Encoding can be done using a single frequency for each pixel arrangement. It can also be encoded using DTMF tones. Each DTMF tone, or series of tones, can represent one pixel state. Additionally, a series of tones can play at the beginning of a video and contain data for synchronized pixel switching for the duration of the video. A sine or square wave 1114 is provided to a comparator 1116, which generates a corresponding digital square wave 1118. Processor 1120 receives digital square wave 1118 and decodes it to produce a pixel data output signal 1126. Alternatively or in addition, processor 1120 receives DTMF tones 1124 and decodes the tones to generate pixel data output signal 1126.

Figure 12:
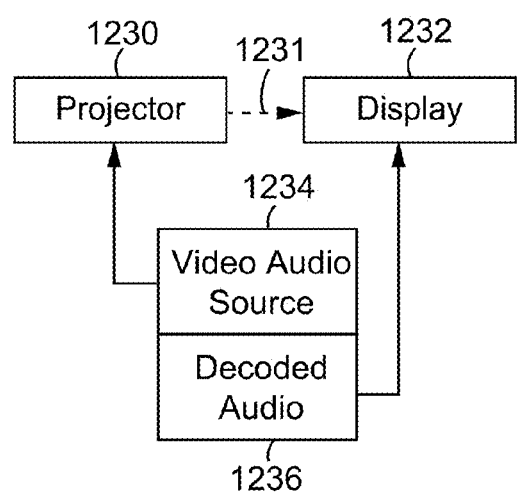
FIG. 12 is a block diagram illustrating synchronizing a transparent display screen with video using audio encoding of data.

FIG. 12 is a block diagram illustrating synchronizing a transparent display screen with video using audio encoding of data. A projector 1230 projects content 1231 for display on an addressable display screen 1232 such as any of the display screens discussed herein. A video and audio source 1234 provides the video content with associated audio content to projector 1230 for projection onto the display screen 1232. The audio content from video and audio source 1234 is decoded to provide decoded audio 1236, corresponding with pixel data output 1226, which is used to synchronize the display screen 1232 with the video content projected upon it. As used herein, "video content" includes still images as well as moving images.

The pixels of the display screen must match the video content so that the video content is projected onto pixels having the diffuse state. When creating video content, the encoded pixel data is recorded on the audio track of the video in video and audio source 1234. When the video is played back with the video content projected onto display screen 1232, the encoded data will be played as an audio track, and decoded audio 1236 is used to control switching of pixels in display screen 1232 such that the projected video is displayed on pixels in the diffuse state. Preferably, decoded audio 1236 is also used to set the pixels not receiving the projected video to the transparent state.

Figure 13:
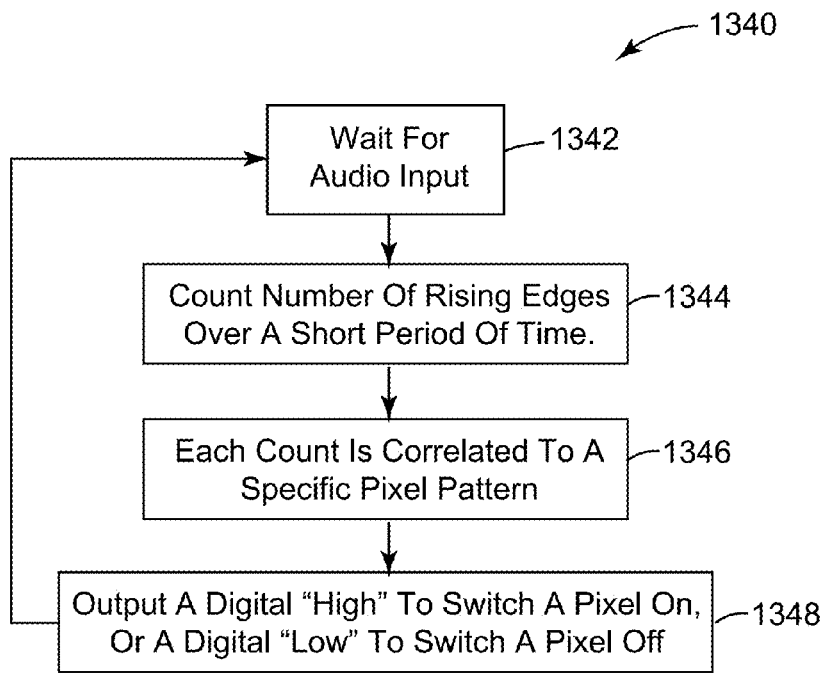
FIG. 13 is a flow chart of a method for audio encoding of data.

FIG. 13 is a flow chart of a method 1340 for audio encoding of data. Method 1340 can be implemented in software, for example, for execution by processor 1120 in system 1110. In method 1340, the system waits for audio input (step 1342), which the system receives from the audio content in video and audio source 1234. When receiving audio input, the system counts the number of rising edges of the signal over a short period of time (step 1344). As the frequency increases, the counts increase accordingly. Each count is correlated to a specific pixel pattern (step 1346). Based upon the correlated counts, a digital high signal is output to switch a particular pixel on in display screen 1232, and a digital low signal is output to switch a particular pixel off in display screen 1232 (step 1348). The method repeats to continue decoding audio signals for synchronizing the projected video content from video and audio source 1234 with the switching of pixels in display screen 1232. Methods and devices for encoding a control signal for the display screens discussed herein using audio tones are further described in a commonly owned, concurrently filed patent application entitled "AUDIO ENCODING OF CONTROL SIGNALS FOR DISPLAYS," issued as U.S. Pat. No. 9,137,542 and incorporated herein by reference in its entirety.

Figure 14:
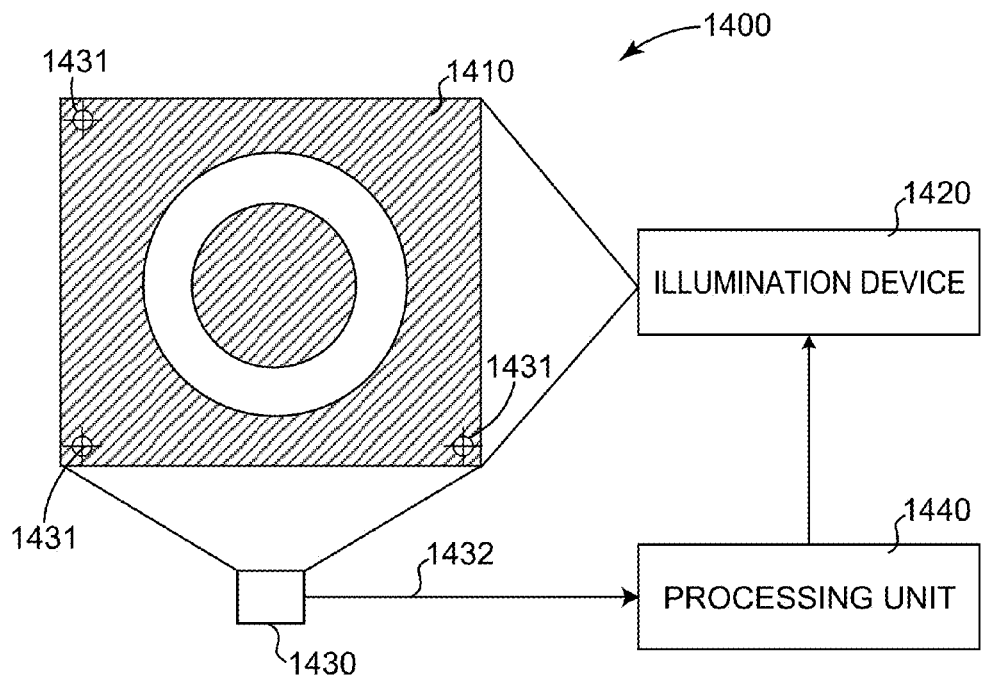
FIG. 14 is a block diagram of a display system capable of projection alignment.

Some embodiments involve a display system capable of projection alignment. As depicted in FIG. 14, a display system 1400 includes a switchable display screen 1410 comprising an x-y array of addressable pixels or regions, each pixel or region capable of being switched from a transparent state to a diffuse state, an illumination device 1420, e.g., projector configured to projecting light onto the switchable display screen 1410, an image sensor 1430 such as a camera or charge coupled device (CCD) configured to capture a series of projected alignment content, and a processing unit 1440 comprising a processor or other circuitry electronically coupled to the image sensor 1430. The processing unit 1440 is configured to receive a series of captured alignment content from the image sensor 1430 and to align the light projected by the illumination device 1420 with at least one of the regions of the display screen 1410 that is in a diffuse state or at least one of the regions of the display screen 1410 that is in a transparent state.

In some embodiments, the display system 1400 is capable of automatic or semiautomatic alignment of projected light from the illumination device 1420 onto or through a plurality of addressable pixels of the switchable display screen 1410 that are either in their diffuse state or are in their transparent state depending upon the application. In these embodiments, the display system 1400 can include one or more alignment marks 1431 or images that can be projected onto at least a portion of the display screen 1410. The display screen 1410 can be configured to receive the projected light, including alignment marks 1431, and to display the projected light, onto a plurality of x-y addressable pixels of an x-y addressable array that are in their diffuse state. In other embodiments, the display screen 1410 can be configured to receive the projected light, including alignment marks 1431, and to display the projected light, onto a plurality of addressable pixels of an addressable array that are in their transparent state.

In some embodiments, the one or more alignment marks 1431 can be proximate to a border of the display screen or proximate to a border of a region of a plurality of x-y addressable pixels that are in their diffuse state. For example, the alignment marks 1431 may be arranged in an L-shaped pattern near the border as shown in the embodiment of FIG. 14. In other embodiments, the one more alignment marks can be in other locations on the display screen.

The image sensor 1430 can be configured to capture projected light that can include alignment marks 1431 and to generate a sensor signal 1432 corresponding to the captured projected light. In some embodiments, the image sensor 1430 can be arranged to capture an image of the entire display screen, e.g., including alignment marks 1431. The processing unit 1440 can be electronically coupled to the image sensor 1430 and configured to receive the sensor signal 1432 and determine the positions of the one or more alignment marks 1431 based on the sensor signal 1432.

Figure 15:
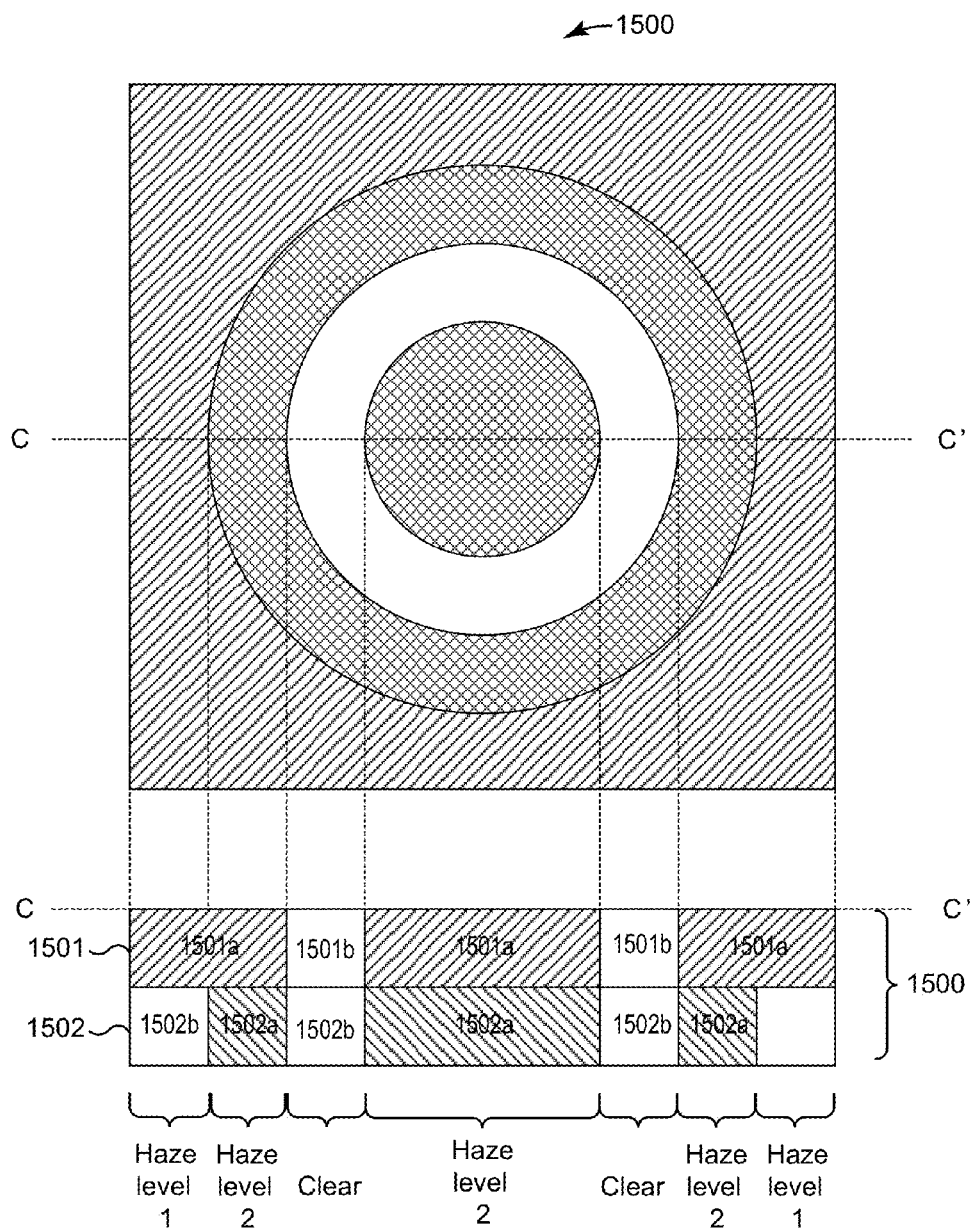
FIG. 15 shows a stacked display screen capable of multiple haze levels.

In some implementations, the display screen may be arranged to have a number of intermediate levels of haze. For example, intermediate haze levels can be achieved using multiple stacked display screens as illustrated in FIG. 15. The upper portion of FIG. 15 shows a top view of a display screen 1500 capable of two levels of haze. The lower portion of FIG. 15 shows a cross sectional view of display screen 1500 through C-C'. Display screen 1500 includes two addressable screens 1501, 1502, one or both of which may be similar to screen 100 of FIG. 1 or screen 400 of FIG. 4, for example. In this configuration, regions 1501a of screen 1501 that are in a hazy state that overlap regions 1502b of screen 1502 that are in a clear state produce regions of the stacked screen 1500 that have a first haze level (Haze Level 1). Regions 1501a of screen 1501 that are in a hazy state that overlap regions 1502a of screen 1502 that are also in a hazy state produce regions of the stacked screen 1500 that have a second haze level (Haze Level 2). Regions 1501b of screen 1501 in a clear state that overlap one or more regions 1502b of screen 1502 that are also in a clear state produce one or more regions of the stacked screen 1500 that are clear. Additional levels of haze can be obtained using additional stacked screens.

In some embodiments, a camera and/or signal processor (e.g., camera 1430 and processing unit 1440 shown in FIG. 14) can be used for image enhancement of the image projected on the display. The image enhancement can include, for example, color correction, edge enhancement and/or contrast modification. When a camera or other image sensor is included in the display system, feedback based on the image captured by the camera could be used to adjust the amount of image enhancement applied to the projected image.

Alternatively, image enhancement may be implemented by a signal processing unit, e.g., processing unit 1440 in FIG. 14, without a camera or other image sensor. In this scenario, the amount image enhancement could be adjusted to suit the situation (high ambient light conditions, etc.) or to the personal preference of the viewer.

Various types of image enhancement software could be employed by the processing unit, including both spatial domain and frequency domain techniques. The image enhancement techniques can include, but are not limited to, histogram adjustment or contrast stretching, unsharp masking, deconvolution, and spectra transformations, for example.

Figure 16:
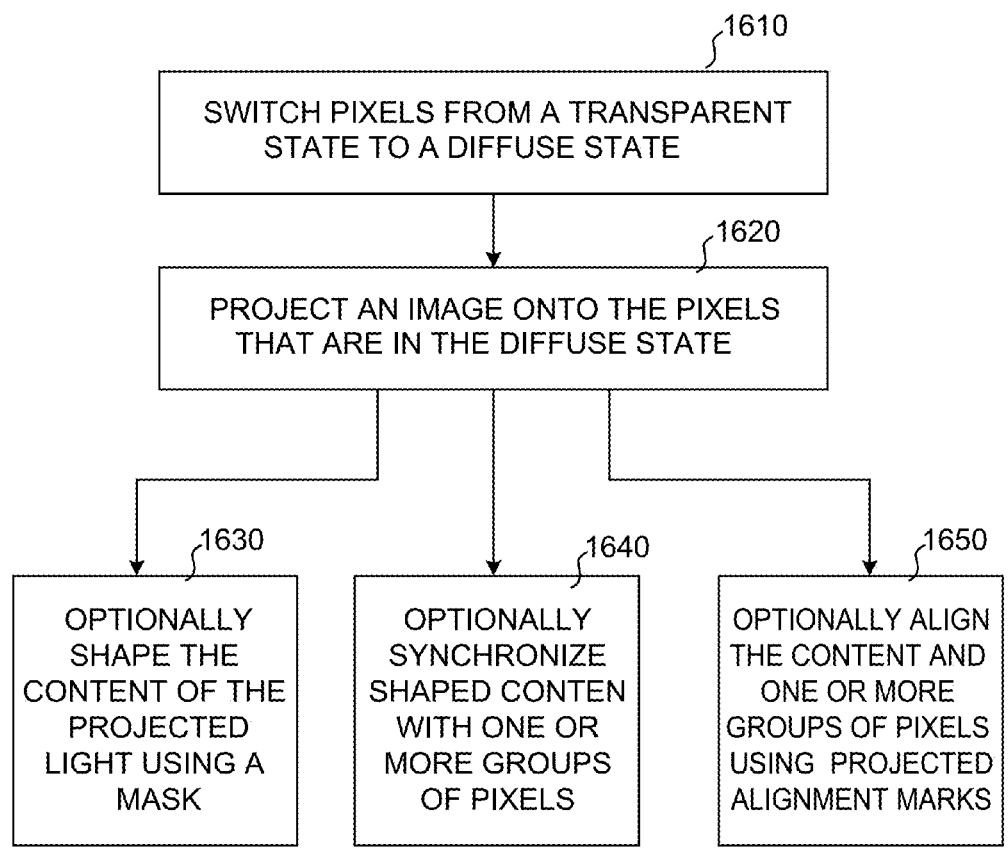
FIG. 16 is a flow diagram illustrating a method of operating a display system in accordance with various embodiments.

Some methods described herein are directed to operating a switchable display system that includes an illumination device for projecting light onto a switchable display screen wherein the switchable display screen comprises a first transparent conductor layer disposed upon a first transparent substrate, and a second transparent conductor layer disposed upon a second transparent substrate. A first polymeric liquid crystal composition comprising first spacer elements is disposed between and in contact with the first transparent conductor layer and the second transparent conductor layer. The first polymeric liquid crystal composition comprises a polymer-stabilized cholesteric texture layer. At least one of the first transparent conductor and the second transparent conductor comprises a plurality of addressable pixels. The pixels are capable of being switched from a transparent state to a diffuse state. As illustrated in the flow diagram of FIG. 16, a method may include switching 1610 at least some pixels of the display screen to the diffuse state and projecting 1620 an image onto the pixels that are in a diffuse state. In some optional implementations, a method includes projecting the light through a mask to provide 1630 light having a shaped content. The shaped content of the projected light can be synchronized 1640 with the diffuse state of at least one of the plurality of x-y addressable pixels. In some implementations, the shaped content of the projected light is synchronized with the diffuse state of at least one of the plurality of x-y addressable pixels of the array of x-y addressable pixels using audio tones.

Some methods involve synchronizing the shaped content of the projected light with the diffuse state of at least one of the plurality of x-y addressable pixels of the addressable pixels using high bandwidth information comprising at least a video signal and an audio signal. Some methods involve synchronizing the shaped content of the projected light with the diffuse state of at least one of the plurality of addressable pixels using brightness thresholding. Brightness thresholding involves determining a brightness value for each pixel in the projected content. if the brightness for a pixel or portion of the display screen exceeds a certain value, the display controller switches that portion of the display screen to its diffuse state.

The shaped content of the projected light can be aligned 1650 with at least one of the plurality of addressable pixels. For example, the shaped content of the projected light may be aligned with the a group of the plurality of addressable pixels that are in the diffuse state. Alignment of the projected light and the addressable pixels may be accomplished using alignment marks that are projected onto the display screen.

At least some aspects of the present disclosure are directed to a method of automatic or semiautomatic alignment of a display system, including the steps of projecting a piece of alignment content, by a projector, to a switchable display screen, providing a fiducial mark proximate to a border of a region of a plurality of x-y addressable pixels that are in their diffuse state on the display screen; displaying that piece of alignment content on at least part of a region of a plurality of x-y addressable pixels that are in their diffuse state on the display screen; capturing an image of at least part of the display screen when the piece of alignment content is displayed by an image sensor, wherein the captured image comprises a visual representation of the fiducial mark, and determining, by a processing system, the position of the fiducial mark based on the captured image, wherein the projected light has a projection area on the shaped projection screen. Alignment of projected light from an illumination device onto a shaped display screen is disclosed, for example, in Applicants' jointly-owned and pending U.S. Prov. Pat. Appl. Ser. Nos. 61/782,958 and 61/783,206 both filed on Mar. 14, 2013 and entitled "Alignments for a Projecting System With a Shaped Projection Screen Using Alignment Marks" and "Alignments for a Projection System With a Shaped Projection Screen Using Alignment Content", respectively.

In some embodiments, the processing unit of the display system can be configured to determine an alignment factor based upon the captured projected alignment content from the image sensor. The processing unit can be further configured to adjust presentation content based upon the alignment factor and to provide adjusted presentation content to the projector. The processing unit can be further configured to determine an alignment factor based upon the position of one or more alignment marks. In some embodiments, the processing unit can be further configured to adjust the captured content based upon the alignment factor and to provide the adjusted content to the illumination device.

Embodiments described herein relate to a transparent display system comprising a pixelated liquid crystal screen and a projector. The transparent liquid crystal screen could include a Polymer Stabilized Cholesteric Texture (PSCT) layer. The PSCT screen provides a high haze state (diffuse/scattering) for projection and a low haze/high clarity clear state for high transparency. The screen can be driven passive matrix, allowing higher number of pixels and more resolution than a direct drive display. Portions of the screen can be driven clear, while other portions remain hazy, resulting in a display screen containing areas of high transmission while simultaneously displaying an image in diffuse areas of the display screen. The capability of higher resolution with a PSCT screen enables a large number of display shapes to be used. The display screen can be configured to match projector content. Additional features such as moving the image around to different portions of the screen can also be employed.

A variety of different methods can be utilized to synchronize the switching of the PSCT screen with the video content from the projector. In some implementations, synchronization may be accomplished using audio tones. Data encoded over audio could be used to synchronize a set of predetermined shapes on the PSCT screen with the projector content. If the projector content is changed, new screen shapes could be selected. Because audio is low bandwidth, there would be a limit to the number of shapes that can be used.

Another synchronization method involves encoding each frame as a bitmap image or gif. As the image changes in each frame, only the data for the changing pixels needs to be sent to the display. This compression of data allows more information to be sent over the audio channel.

A high bandwidth option may be used to provide synchronization of video with the all pixels on the PSCT screen, and is not limited to synchronization with predetermined shapes. Synchronization of the video and pixels of the PSCT screen can be accomplished using standard encoding for 3D displays, for example. One of the 3D channels can provide information to the PSCT screen, while the other 3D channel provides video content for the projector.

Another option involves brightness thresholding for the display screen. If the brightness value for each pixel in the video content exceeds a certain value, display controller circuitry would be configured to switch that portion of the PSCT screen to its hazy/diffuse state. In this implementation, the controller circuit is configured to recognize the pixels on the screen that should be switched to match the video. Scenarios such as mismatch in the resolution of the screen and projector and/or switching speed of the PSCT screen that is not full video rate may add some complexity to this approach.

Alignment between the display screen and projected content may be accomplished using a screen containing alignment marks or projecting alignments marks. A camera system captures the information and the system digitally corrects for any distortion. Additional methods for determining and maintaining alignment could be used for a pixilated display. One method is to project a white image of each pixel or a set number of pixels and verify their location. Similar methods for compensation, such as pre-distortion of the projected image could be used. Image enhancement software for color correction or contrast modification could also be used with the transparent display system. Applications for the display systems discussed herein include digital merchandising, consumer displays, information displays, or interactive displays for windows in stores, offices, kiosks, interactive tables, simulators, etc.

Following are a list of embodiments of the present disclosure.

Item 1 is a display system, comprising:
  a switchable display screen that includes:
  a first transparent substrate;
  a first transparent conductive layer disposed upon the first transparent substrate;
  a second transparent substrate;
  a second transparent conductive layer disposed upon the second transparent substrate; and
  a polymer-stabilized cholesteric texture layer and spacer elements disposed between and in contact with the first transparent conductive layer and the second conductive layer, wherein the display screen comprises a plurality of addressable regions, each region capable of being switched from a transparent state to a diffuse state.

Item 2 is the display system according to item 1, wherein at least one of the first transparent conductive layer and the second transparent conductive layer is patterned to form contacts and electrical leads for the addressable regions.

Item 3 is the display system according to any of items 1 through 2, wherein:
  both of the first transparent conductive layer and the second transparent conductive layer are patterned to form contacts and electrical leads for the addressable regions; and
  the addressable regions are configured to be passive matrix driven.

Item 4 is the display system according to any of items 1 through 3, wherein at least one of the first transparent conductive layer and the second transparent conductive layer comprises indium-tin oxide, antimony-tin oxide, fluorine doped tin oxide, doped zinc oxide, graphene, polyacetylenes, polyanilines, polypyrroles, polythiophenes, poly (3,4-ethylenedioxythiophene) [PEDOT]:poly(styrene sulfonate) PSS, nanowires, or doped poly(4,4-dioctylcyclopentadithiophene).

Item 5 is the display system according to any of items 1 through 4, further comprising an illumination device including a mask, the illumination and mask arranged to project light having a shaped content onto the display screen.

Item 6 is the display system according to item 5, wherein the mask comprises a virtual mask.

Item 7 is the display system according to any of items 5 through 6, wherein the shaped content of the projected light is synchronized with the diffuse state of at least one of the plurality of addressable regions.

Item 8 is the display system according to item 7, wherein the shaped content of the projected light substantially matches the shape of the plurality of addressable regions that are in the diffuse state.

Item 9 is the display system according to item 7, wherein when the shaped content of the projected light changes, the shape of the addressable regions changes from a transparent state to a diffuse state or from a diffuse state to a transparent state in synchronization with the projected light changes.

Item 10 is the display system according to item 7, wherein projected light is synchronized with the diffuse state of at least one of the plurality of addressable regions using low bandwidth synchronization.

Item 11 is the display system according to item 10, wherein the low bandwidth synchronization comprises audio tones.

Item 12 is the display system according to item 7, wherein projected light is synchronized with the diffuse state of at least one of the plurality of addressable regions using high bandwidth synchronization.

Item 13 is a display system, comprising:
  a switchable display screen comprising a plurality of addressable regions, each region capable of being switched from a transparent state to a diffuse state;
  an illumination device for projecting light onto the switchable display screen;
  an image sensor configured to capture a series of projected alignment content; and
  a processing unit electronically coupled to the image sensor and configured to receive the series of captured alignment content and to align the projected light with at least one of the addressable regions that is in a diffuse state or at least one of the electrically-isolated regions that is in a transparent state.

Item 14 is a display system according to item 13, wherein the addressable regions comprises an x-y addressable array that is configured to be passive matrix driven.

Item 15 is a display system according to any of items 13 through 14, wherein the processing unit is further configured to determine an alignment factor based upon the captured projected alignment content from the image sensor.

Item 16 is a display system according to any of items 13 through 15, wherein the processing unit is further configured to adjust presentation content based upon the alignment factor and to provide adjusted presentation content to the illumination device.

Item 17 is a display system according to any of items 13 through 16, further comprising one or more alignment marks proximate to a border of the display screen.

Item 18 is a display system according to any of items 13 through 17, wherein the one or more alignment marks are projected alignment marks.

Item 19 is a display system according to any of items 13 through 18, wherein the processing unit is further configured to determine an alignment factor based upon positions of one or more alignment marks.

Item 20 is a display system according to any of items 13 through 19, wherein the processing unit is further configured to adjust the captured alignment content based upon the alignment factor and to provide the adjusted presentation content to the illumination device.

Item 21 is a method of operating a switchable display system, comprising:
  switching one or more regions of a switchable display screen from a transparent state to a diffuse state, wherein the switchable display screen comprises:
  a first transparent substrate;
  a first transparent conductive layer disposed upon the first transparent substrate;
  a second transparent substrate;
  a second transparent conductive layer disposed upon the second transparent substrate; and a polymer-stabilized cholesteric texture layer and spacer elements disposed between and in contact with the first transparent conductive layer and the second conductive film; and projecting light onto the one or more addressable regions that are in the diffuse state.

Item 22 is the method of operating a switchable display system according to item 21, wherein projecting light comprises projecting light having shaped content using a mask.

Item 23 is the method of operating a switchable display system according to any of items 21 through 22, further comprising synchronizing projecting light having the shaped content and switching regions of the switchable display.

Item 24 is the method of operating a switchable display system according any of items 21 through 23, further comprising synchronizing projecting light having the shaped content and switching regions of the switchable display using audio tones.

Item 25 is the method of operating a switchable display system according to any of items 21 through 24 further comprising synchronizing projecting light having the shaped content and switching regions of the switchable display using high bandwidth information comprising at least a video signal and an audio signal.

Item 26 is the method of operating a switchable display system according to item 23, further comprising synchronizing projecting light having the shaped content and switching regions of the switchable display using brightness thresholding.

Item 27 is the method of operating a switchable display system according to any of items 21 through 26, further comprising aligning the projected light with the one or more addressable regions that are in the diffuse state.

Item 28 is the method of operating a switchable display system according to item 27, wherein:

projecting light comprises projecting light having shaped content; and aligning the projected light comprises aligning the shaped content with the one or more addressable regions that are in the diffuse state.

Item 29 is the method of operating a switchable display system according to item 27, wherein aligning the shaped content of the projected light comprises aligning the shaped content using alignment marks.

Item 30 is the method of operating a switchable display system according to item 27, wherein aligning the shaped content of the projected light comprises aligning the shaped content using projected alignment content.

Various processes described above may be implemented using circuitry and/or software modules that interact to provide particular results. This functionality can be implemented either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate controlling display screens as described above.

Various modifications and alterations of the disclosed embodiments will become apparent to those skilled in the art without departing from the scope and principles of this disclosure, and it should be understood that this disclosure is not to be unduly limited to the illustrative embodiments set forth hereinabove.

What is claimed is:

1. A display system, comprising:
a switchable display screen that includes:
a first transparent substrate;
a first transparent conductive layer disposed upon the first transparent substrate;
a second transparent substrate;
a second transparent conductive layer disposed upon the second transparent substrate; and
a polymer-stabilized cholesteric texture layer and spacer elements disposed between and in contact with the first transparent conductive layer and the second conductive layer, wherein the display screen comprises a plurality of addressable regions, each region capable of being switched from a transparent state to a diffuse state, wherein the display system further comprises an illumination device including a mask and being arranged to project light having a shaped content onto the display screen, wherein the shaped content of the projected light is synchronized with the diffuse state of at least one of the plurality of addressable regions using low bandwidth synchronization or using high bandwidth synchronization.

2. A display system according to claim 1, wherein at least one of the first transparent conductive layer and the second transparent conductive layer is patterned to form contacts and electrical leads for the addressable regions.

3. A display system according to claim 1, wherein:
both of the first transparent conductive layer and the second transparent conductive layer are patterned to form contacts and electrical leads for the addressable regions; and
the addressable regions are configured to be passive matrix driven.

4. A display system according to claim 1, wherein at least one of the first transparent conductive layer and the second transparent conductive layer comprises indium-tin oxide, antimony-tin oxide, fluorine doped tin oxide, doped zinc oxide, graphene, polyacetylenes, polyanilines, polypyrroles, polythiophenes, poly (3,4-ethylenedioxythiophene) [PEDOT]:
poly(styrene sulfonate) PSS, nanowires, or doped poly(4, 4-dioctylcyclopentadithiophene).

5. A display system according to claim 1, wherein the mask comprises a virtual mask.

6. A display system according to claim 1, wherein the shaped content of the projected light substantially matches the shape of the plurality of addressable regions that are in the diffuse state.

7. A display system according to claim 1, wherein when the shaped content of the projected light changes, the shape of the addressable regions changes from a transparent state to a diffuse state or from a diffuse state to a transparent state in synchronization with the projected light changes.

8. A display system according to claim 1, wherein the projected light is synchronized with the diffuse state of at least one of the plurality of addressable regions using low bandwidth synchronization.

9. A display system according to claim 8, wherein the low bandwidth synchronization comprises audio tones.

10. A display system according to claim 1, wherein the projected light is synchronized with the diffuse state of at least one of the plurality of addressable regions using high bandwidth synchronization.

11. A method of operating a switchable display system, comprising:
switching one or more regions of a switchable display screen from a transparent state to a diffuse state, wherein the switchable display screen comprises:
a first transparent substrate;
a first transparent conductive layer disposed upon the first transparent substrate;
a second transparent substrate;
a second transparent conductive layer disposed upon the second transparent substrate; and
a polymer-stabilized cholesteric texture layer and spacer elements disposed between and in contact with the first transparent conductive layer and the second conductive layer; and
projecting light having shaped content onto one or more addressable regions that are in the diffuse state using a mask, the method further comprising synchronizing projecting light having the shaped content and switching regions of the switchable display using:
audio tones,
high bandwidth information comprising at least a video signal and an audio signal, or brightness thresholding.

12. A method of operating a switchable display system according to claim 11, wherein synchronizing projecting light having the shaped content and switching regions of the switchable display uses the audio tones.

13. A method of operating a switchable display system according to claim 11, wherein synchronizing projecting light having the shaped content and switching regions of the switchable display uses the high bandwidth information.

14. A method of operating a switchable display system according to claim 11, wherein synchronizing projecting light having the shaped content and switching regions of the switchable display uses brightness thresholding.

15. A method of operating a switchable display system according to claim 11, further comprising aligning the shaped content of the projected light with the one or more addressable regions that are in the diffuse state.

16. A method of operating a switchable display system according to claim 15, wherein aligning the shaped content of the projected light comprises aligning the shaped content using alignment marks.

17. A method of operating a switchable display system according to claim 15, wherein aligning the shaped content of the projected light comprises aligning the shaped content using projected alignment content.

* * * * *